Dec. 13, 1927.

J. E. HILL

AUTOMOBILE TOP

Filed Aug. 16, 1926

1,652,359

Inventor:
John E. Hill,
by Rippey & Kingsland.
His Attorneys.

Patented Dec. 13, 1927.

1,652,359

UNITED STATES PATENT OFFICE.

JOHN E. HILL, OF ST. LOUIS, MISSOURI.

AUTOMOBILE TOP.

Application filed August 16, 1926. Serial No. 129,397.

This invention relates to automobile tops, and an object is to provide an improved automobile top that will afford better protection against heat or cold from the outside than automobile tops of usual construction.

Another object of the invention is to provide an improved automobile top having an outside top portion and an inside lining spaced from the top portion and supported by cross members, and an insulating partition forming insulating air spaces between the partition and the top portion and the partition and the lining respectively.

Another object of the invention is to provide an improved automobile top possessing the advantages apparent from structure herein shown and described, reference being made to the drawing, in which, Fig. 1 is a longitudinal vertical sectional view of my improved automobile top.

Figure 1:
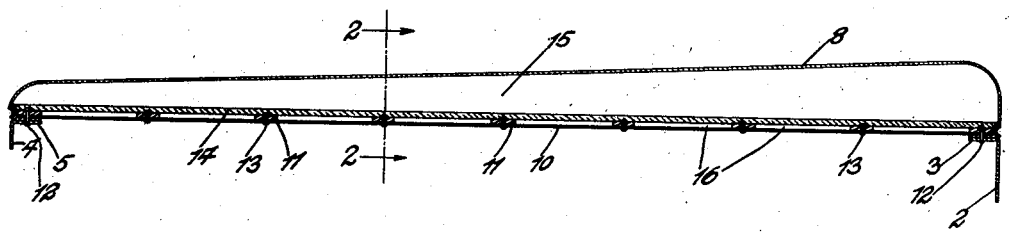
Figure 2:
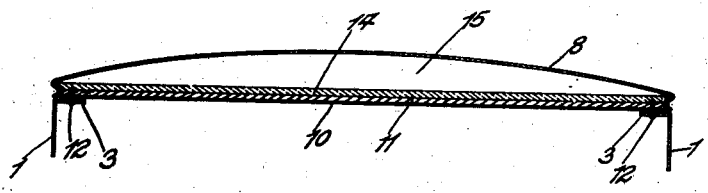
Fig. 2 is a cross sectional view on a line such as 2—2 of Fig. 1.

The side walls 1 and rear wall 2 may be of any appropriate design and material. As shown, said walls are made of metal and formed with inwardly extended flanges 3 at their upper edges. A cross member 4 at the front end is formed with an inwardly extended flange 5 similar to the flanges 3.

Figure 3:
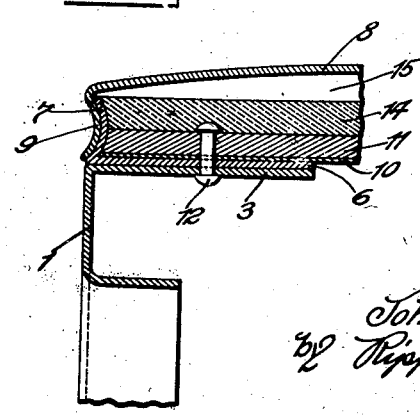
Fig. 3 is an enlarged sectional view of a portion of one of the sides of the automobile top being on the same section line as Fig. 2.

A strengthening top securing member 6 is seated upon all of the flanges 3 and 5 and may be made of a single piece of metal or of a number of pieces, as desired. The outer end of the top securing member 6 on both sides and both ends is provided with an upwardly extending flange 7 which is arcuate in vertical cross section (Fig. 3) forming a groove on the outside. The outside top member 8 is composed of metal, or other appropriate material, and on each side and each end has a flange 9 curved to the shape of the flange 7 and having close binding engagement with the flange 7, the curved portion of the flange 9 seating in the groove formed by the curvature of said flange 7. This joint is made close and tight so that the outside top member will be held perfectly rigid.

An inside lining 10 for the top of the automobile has its edges seated upon the parts 6 on both sides and ends of the automobile. A number of cross members 11 have their ends bearing upon the lining 10 on the parts 6 at the sides and are secured thereto by fasteners 12 passing through the parts 3, 6, 10 and 11. The lining 10 may be and preferably is secured to the cross members 11 intermediate of the sides of the automobile by fasteners 13.

A partition 14 preferably of some insulating material such as cork or asbestos, although any other selected material may be used, is supported on the cross members 11 extending the full width and full length of the automobile having close contact with the flanges 7 at the sides and ends and forming an air space 15 between said partition and the top edges of the automobile and air chambers 16 between said partition and the lining 10.

From the foregoing, it will be seen that my improved construction provides an automobile top that affords better protection against the heat and cold from the outside than is afforded by automobile tops of usual construction. The air spaces 15 and 16 afford better insulation and the insulating lining arranged in the relationship shown and described maintains these air spaces permanently so that a protection is afforded during the life of the automobile. The specific construction and arrangement of the parts may be varied without departure from the nature and principle of the invention. I do not restrict myself unessentially, but what I claim and desire to secure by Letters Patent is:—

1. The combination with the sides and rear end of an automobile body, of a top supporting member attached to said sides and rear, a metallic top, engaging portions at the outer edges of said supporting member and said top, supporting said top spaced vertically above said supporting member, a number of cross members having their ends attached to said supporting member, a partition wall supported on said cross members and spaced vertically from the top member leaving an unobstructed space between said partition wall and said top throughout the length of the top, and a lining secured to said cross members and having its side edges clamped between said cross members and said supporting member.

2. The combination with the sides and rear end of an automobile body, of a top supporting member attached to said sides and rear, a metallic top, engaging portions along the edges of said supporting member and said top, supporting said top spaced vertically above the remaining portion of said supporting member, a number of cross members having their ends attached to said supporting member, a partition wall supported on said cross members and spaced vertically from the top member, a lining secured to said cross members and having its side edges clamped between said cross members and said supporting member, and fasteners securing said cross members and said supporting member to the side and end walls of the automobile.

JOHN E. HILL.